Patented Oct. 16, 1951

2,571,286

UNITED STATES PATENT OFFICE 2,571,286

SULFONATED ALCOHOLS

Julian A. Otto, Long Island City, and Everett E. Gilbert, New York, N. Y., assignors to Allied Chemical & Dye Corporation, New York, N. Y., a corporation of New York No Drawing. Application February 12, 1948, Serial No. 8,003

10 Claims. (Cl. 260—513)

This invention relates to the manufacture of new sulfonated alcohols.

Potassium acetaldehyde disulfonate and its manufacture by reaction of acetylene with sulfuric acid, followed by neutralization, are described in the literature. The product is normally obtained in the form of a monohydrate which when heated in the presence of alkalies is broken down into the salts of formic and methionic acids. This behavior of potassium acetaldehyde disulfonate is described, for example, by Backer in "Rec. des Trav. Chim.," vol. 48, page 572 (1929), and by Schroeter in "Annalen," vol. 303, pages 122 and 123 (1898).

It is an object of the present invention to prepare new sulfonated alcohols useful in the preparation of surface-active agents, and in the manufacture of esters in general. A further object is to provide a process for the manufacture of such products from potassium acetaldehyde disulfonate as the starting material. Further objects will appear from the following description of the invention and illustrative examples of its application.

In accordance with the present invention potassium acetaldehyde disulfonate is reacted with formaldehyde in the presence of an acid-binding agent, whereby the potassium acetaldehyde disulfonate is reduced to the corresponding alcohol. The equation for this reaction is believed to be as follows:

Suitable acid-binding agents are strongly alkaline alkali-metal and alkaline-earth-metal compounds such as potassium hydroxide and carbonate, sodium hydroxide and carbonate, barium oxide, and calcium oxide. When a potassium compound is employed as acid-binding agent, the product is obtained in the form of the potassium salt. When a sodium compound is employed as the acid-binding agent, the potassium salt may be recovered in admixture with a minor proportion of the sodium salt. When a calcium compound is employed as acid-binding agent, the product is recovered in admixture with calcium formate.

The alkali-metal ethanol disulfonates react with anhydrides and acid chlorides to form esters. They may be converted to hydrous free acid, $CH_2OHCH(SO_3H)_2$, by treatment with cation exchange resins. Suitable resins of this type are well known and are available commercially under a variety of trade names, e. g. "Dowex 50." From the free acid other metal salts may be obtained by reaction with appropriate compounds, hydroxides for example, of the metal whose salt is desired.

The conversion of potassium acetaldehyde disulfonate to the alkali-metal ethanol disulfonate may be effected advantageously by heating the acetaldehyde disulfonate with formaldehyde and alkali-metal hydroxide or carbonate in aqueous solution at a temperature between about 50° C. and about 100° C. While the reaction proceeds with equimolecular quantities of acetaldehyde disulfonate and formaldehyde, larger proportions of formaldehyde increase the yield of the desired ethanol disulfonate. Consequently, it is preferred to employ formaldehyde to acetaldehyde disulfonate mol ratios between about 1½ and about 4.

Potassium ethanol disulfonate,

is a white crystalline salt (decomposition point above 300° C.) which is odorless and tasteless and in water at 25° C. has a solubility of about 17.5 parts by weight per 100 parts by weight of water. It is substantially insoluble in alcohol, ether and hydrocarbon solvents, such as benzene, toluene, and petroleum ether. Crystallized from water it forms long, colorless prismatic crystals (as viewed under the microscope (200X)). By heating with acetic anhydride the potassium ethanol disulfonate is converted to the corresponding ester of acetic acid of the molecular formula

Heated with caproyl chloride or palmityl chloride in the presence of pyridine as a binding agent, the potassium ethanol disulfonate yields the corresponding esters of caproic and palmitic acids. These esters possess valuable foaming properties. When heated in dilute acid, they are hydrolyzed to liberate the free caproic and palmitic acids. By passing the potassium ethanol disulfonate through a bed of cation exchange resin the potassium salt is converted to the free acid, which with a water content of 10% is a light, straw-colored, syrupy liquid. Desiccation over calcium chloride at an absolute pressure of about 15 mm. of mercury does not substantially reduce the water content.

The following examples further illustrate the invention. Quantities are expressed in terms of weight unless otherwise specified.

*Example 1.*—A mixture of 298 parts potassium acetaldehyde disulfonate monohydrate, 300 parts formalin (USP 37% formaldehyde solution by weight) and 250 parts water was warmed to 50° C. With good agitation and with the temperature held at 50–55° C. 100 parts potassium carbonate was added in portions of about 10 parts each over a period of about two hours. The mixture was heated five hours more, the temperature being raised gradually to 90° C. The mixture was poured into 4000 parts ethanol (95%), forming a white precipitate. After cooling, this was collected on a filter, washed with ethanol and dried. The crude product amounted to 318 parts. This was recrystallized from 500 parts water yielding as the first crystal crop 180 parts of potassium ethanol disulfonate corresponding to 64% of the theoretical yield. Analyses of the product indicated it to contain 22.2% S and 27.6% K.

*Example 2.*—A well-agitated mixture of 596 parts potassium acetaldehyde disulfonate monohydrate, 300 parts formalin and 200 parts water was warmed to 55–60° C. and maintained at this temperature while a solution of 146 parts $K_2CO_3$ in 150 parts water was added dropwise over a period of one hour and 15 minutes. Next the temperature was raised gradually to 95° C. (over a period of about one hour) and then held at about 95° C. for two hours more. Though the solid had not all gone into solution, it was evident that it had changed in crystal structure. The mixture was poured into 400 parts of ethanol (95%) and after cooling was filtered. The filter cake was washed with 800 parts of ethanol to wash out the soluble potassium formate by-product. The solid residue after air drying amounted to 538 parts, corresponding to 95.5% of the theoretical yield. Analyses indicated the product contained 22.3% S and 28.3% K.

*Example 3.*—To a mixture of 596 parts potassium acetaldehyde disulfonate monohydrate, 600 parts formalin and 400 parts water, heated at 55–60° C. and well agitated, was added dropwise a solution of 150 parts KOH (reagent, pellets) in 280 parts water over a period of 3½ hours. During the last 1½ hours of this time the temperature was raised gradually to 80° C. and after the KOH addition the mixture was heated from 80° to 93° C. over a period of one-half hour. After this time the mixture was a clear solution and just slightly alkaline. It was poured into 4000 parts ethanol, cooled and filtered. The solid residue was washed with ethanol and air dried. It amounted to 563 parts, representing a yield of better than 99% of theoretical. The product analyzed 22.3% S and 27.7% K.

*Example 4.*—A dilute solution containing potassium ethanol disulfonate, 14.1 parts (0.05 mol), was passed through a bed of a cation exchange resin on the hydrogen cycle and the resin washed with distilled water till the effluent was no longer acidic. The total effluent was evaporated on a steam bath at about 85° C. and finally over calcium chloride in a vacuum desiccator at about 15 mm. pressure to constant weight. The product was a straw-colored, syrupy liquid of sweet odor amounting to 11.3 parts. On analysis this viscous product was found to contain 10% water. A potassium determination on the product showed that less than 2% of the original potassium remained in the product and titration of the acid indicated a conversion of about 99% to free acid. Regeneration of the ion exchange resin with hydrochloric acid and evaporation of the effluent yielded 7.4 parts of crude potassium chloride (theoretical quantity from 0.05 mol potassium ethanol disulfonate is 7.45 parts potassium chloride).

*Example 5.*—To a well agitated mixture of 89.4 parts potassium acetaldehyde disulfonate monohydrate, 90 parts formalin and 60 parts water at 55–65° C. was added dropwise over a period of two hours 12.5 parts sodium hydroxide dissolved in 40 parts water. The mixture was heated for one more hour, gradually raising the temperature to 90° C. After cooling, the mixture was poured into 400 parts ethanol (95%) with good stirring. The precipitate that separated was collected on a filter, washed three times with ethanol (40 parts each time) and dried in an oven at 75° C. The final product amounted to 84 parts. The product analyzed as 92% potassium salt and 8% sodium salt of ethanol disulfonic acid. When a dilute solution of the product was passed through a cation exchange resin as in Example 4, the same straw-colored, syrupy liquid of sweet odor was obtained, as was formed from the potassium salt of the ethanol disulfonic acid in Example 4.

*Example 6.*—To a well agitated mixture of 89.4 parts potassium acetaldehyde disulfonate monohydrate, 90 parts formalin and 100 parts water at 55–60° C. was added, during the course of two hours, 11 parts calcium oxide in small portions. During the first hour in which 7 parts of CaO was added the heat of reaction was sufficient to keep the temperature at 55–60° C. During the second hour in which the remaining 4 parts CaO was added heat was applied and the temperature was raised gradually to 90° C. The mixture remained slightly cloudy. When filtered 0.7 part $CaCO_3$ was obtained. The filtrate was poured into 400 parts ethanol (95%) with good stirring. The heavy precipitate that separated was collected on a filter, washed with ethanol and dried. It amounted to 106 parts. Since the calcium formate by-product is not soluble in the ethanol-water liquor as are potassium and sodium formate it separated from solution with the product. A dilute solution of the mixture was passed through a cation exchange resin as in Example 4. When the effluent was evaporated, a syrupy liquid having a sharp odor of formic acid was obtained. Neutralization of this mixture with potassium hydroxide, followed by precipitation and washing with ethanol (both as described in Example 5) yielded the potassium salt of ethanol disulfonic acid in pure form. Sulfur analysis gave 22.8%; calculated for the potassium salt, S=22.7%.

*Example 7.*—A dilute water solution containing 14.1 parts potassium ethanol disulfonate (0.05 mol) was converted to the free acid in a manner similar to that described in Example 4 by means of a cation exchange resin on the hydrogen cycle. The effluent was evaporated down to 125 parts and neutralized with calcium oxide. The product, separated from solution by adding 160 parts of ethanol, when collected on a filter and dried in an oven at 70° C., amounted to 12.4 parts. Analysis showed the product to be about 93% the monohydrate of calcium ethanol disulfonate, $HOCH_2CH(SO_3)_2Ca.H_2O$, and about 4% of the potassium salt of hte disulfonic alcohol. When heated at 100° C. the water of crystallization was removed from the calcium salt. The product is a white free-flowing salt. It does not melt on heating. Its decomposition point is above 300° C. Its solubility in 100 parts water at 25° C. is about 14.5 parts. Recrystallized from water it forms colorless prismatic crystals as observed under the microscope. Like the potassium salt the calcium salt is insoluble in organic solvents.

*Example 8.*—The sodium salt of ethanol disulfonic acid was prepared in a manner similar to the preparation of the calcium salt described in Example 7 by neutralizing ethanol disulfonic acid prepared from the potassium salt by ion exchange as described in Example 4, with sodium hydroxide. The sodium salt $(NaSO_3)_2CHCH_2OH$, was obtained contaminated with about 5% of the potassium salt, as a white, free-flowing crystalline product in substantially theoretical yield. The product has no melting point and its decomposition point is above 300° C. Its water solubility at 25° C. is about 43 parts per 100 parts water. Recrystallized from water it forms diamond shaped colorless crystals as observed under the microscope. Like the potassium salt the sodium salt is insoluble in organic solvents.

In certain of the above examples reference is made to production of the free ethanol disulfonic acid by contacting salts thereof with a cation exchange resin. The resin employed in the particular examples involved was made as follows:

Potassium acetaldehyde disulfonate monohydrate, 298 parts; phenol, 188 parts; and hydrochloric acid (20%), 100 parts, were heated at reflux (110° C.) for 3-4 hours with good agitation. By changing from a reflux to a take-off condenser 900 parts distillate was collected. This distillate was constant boiling hydrochloric acid containing unreacted phenol, 50–55 parts. The distillation residue was diluted to 1000 parts with water. After adding 86 parts formalin (37% $CH_2O$) the mixture was securely stoppered, vigorously agitated to attain good mixing, and then heated for three hours on a steam bath. During this time the mixture set into a firm gel. This was partly broken up, and transferred to an open evaporator and dried to constant weight on a steam bath. The resulting hard resinous material was passed through a grinding machine and screened. Particles between about 30 and 50 mesh were collected separately, slurried with 10% sulfuric acid, and then washed with water until the wash water was neutral. A resin bed of this moist resin, 113 parts, was converted to the hydrogen cycle by passing through it 510 parts of 5% hydrochloric acid and then washing with distilled water till the effluent was neutral.

We claim:

1. As a new compound a member of the group consisting of the sulfonated alcohol, $$(HSO_3)_2CHCH_2OH$$

and salts thereof of the formula $$(MeSO_3)_2CHCH_2OH$$

wherein Me represents a metallic radical.

2. As a new compound an alkali-metal salt of the alcohol $$(HSO_3)_2CHCH_2OH$$

3. As a new compound potassium ethanol disulfonate having the molecular formula $$(KSO_3)_2CHCH_2OH$$

and being in pure form a white crystalline solid, soluble in water and substantially insoluble in alcohol, ether, and benzene.

4. In the manufacture of a sulfonated alcohol defined in claim 1, the process which comprises reacting potassium acetaldehyde disulfonate with formaldehyde in the presence of an acid-binding agent.

5. The process of claim 4, wherein the acid-binding agent is an alkaline alkali-metal compound.

6. The process of claim 4, wherein the acid-binding agent is potassium hydroxide.

7. The process of claim 4, wherein the acid-binding agent is potassium carbonate.

8. The process of claim 4, wherein the potassium acetaldehyde disulfonate is heated between 50° and 100° C. with a molecular excess of formaldehyde and a strongly alkaline alkali-metal compound in aqueous solution.

9. The process of claim 8, wherein the strongly alkaline alkali-metal compound is potassium hydroxide and the formaldehyde to acetaldehyde disulfonate mol ratio is between about 1½ and about 4.

10. The process of claim 8, wherein the strongly alkaline alkali-metal compound is potassium carbonate and the formaldehyde to acetaldehyde disulfonate mol ratio is between about 1½ and about 4.

JULIAN A. OTTO.
EVERETT E. GILBERT.

REFERENCES CITED

The following references are of record in the file of this patent:

UNITED STATES PATENTS

| Number | Name | Date |
| --- | --- | --- |
| 1,999,614 | Nicodemus et al. | Apr. 30, 1935 |
| 2,029,073 | Huttenlocher et al. | Jan. 28, 1936 |
| 2,140,291 | Jenkins | Dec. 13, 1938 |

OTHER REFERENCES

Meves, Ann. der Chemie, v. 143 (1867) pp. 196–200.

Monari, Ber., v. 18 (1885), pp. 1347–1349.